July 31, 1945.  J. A. WATSON, JR  2,380,562
TRANSPORT VEHICLE
Filed April 27, 1943      3 Sheets-Sheet 3
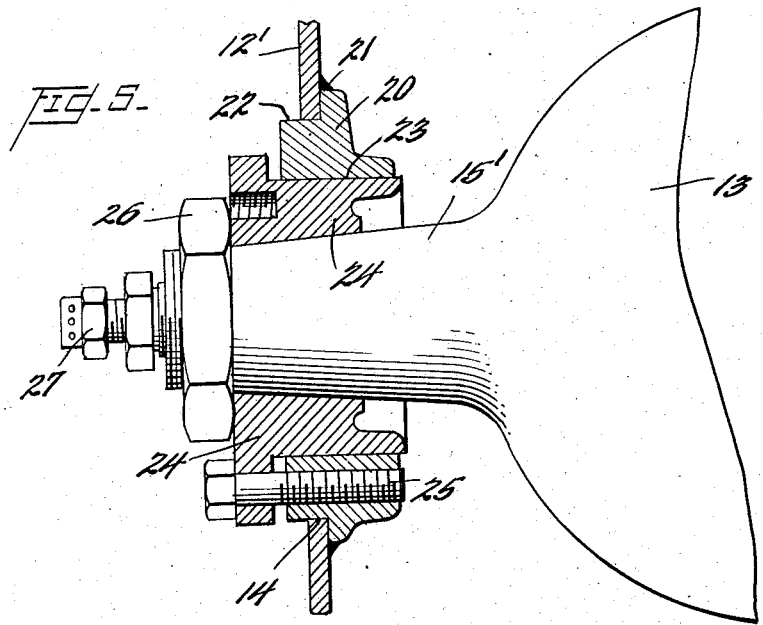
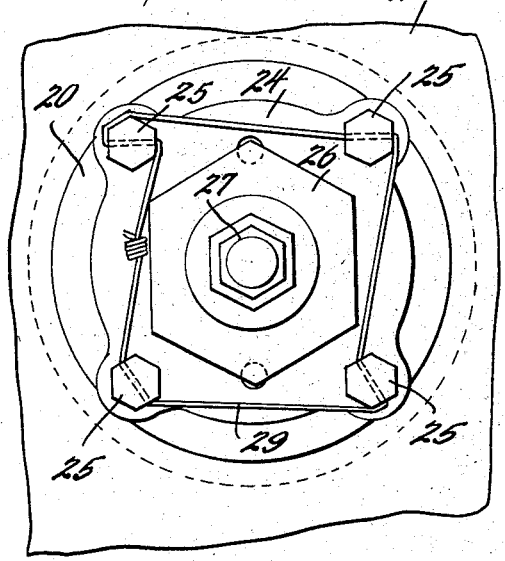
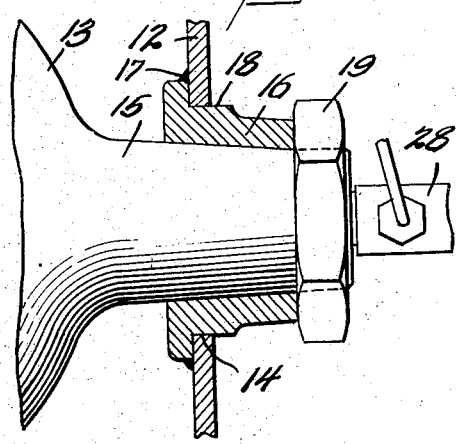
Inventor
James A. Watson, Jr.
By Watson, Cole, Grindle & Watson
Attorney Patented July 31, 1945

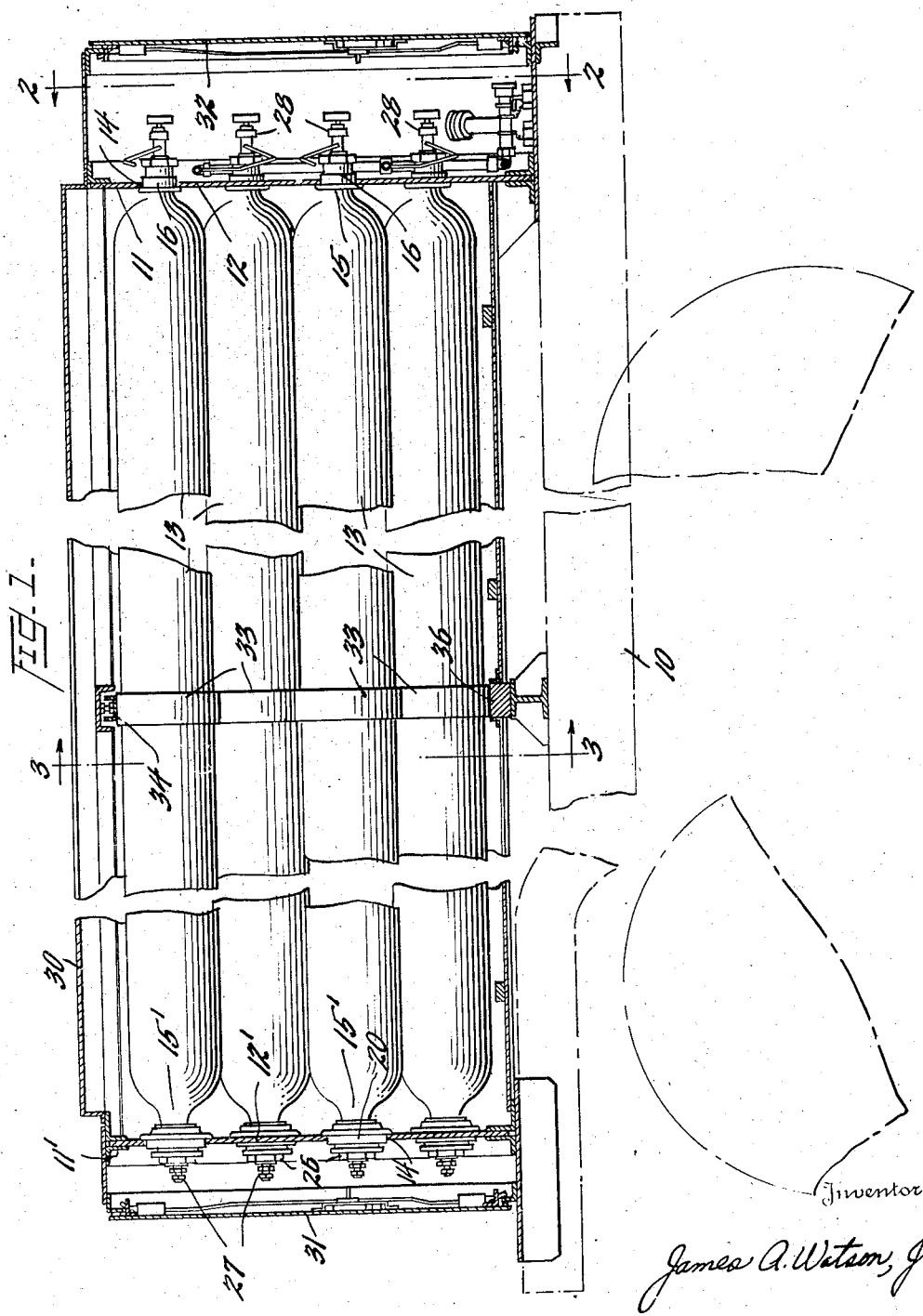

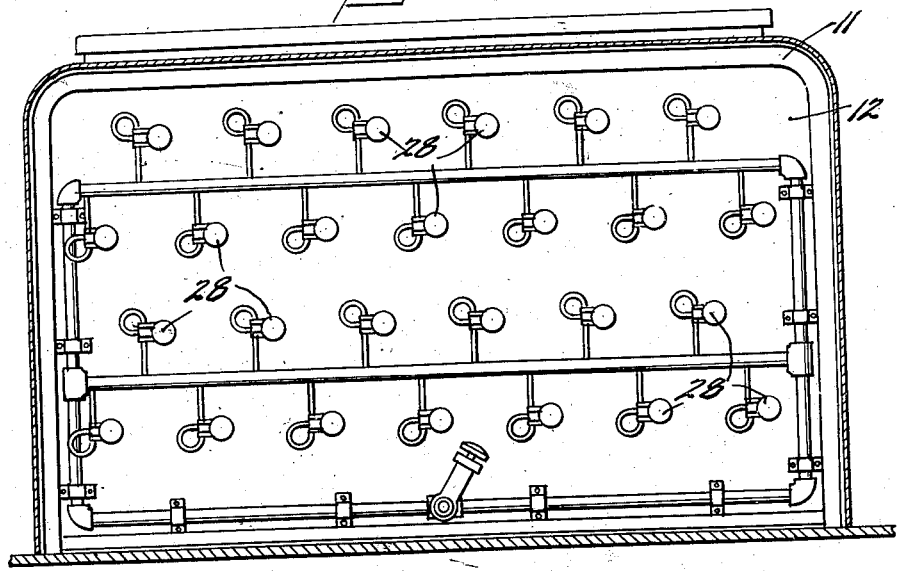
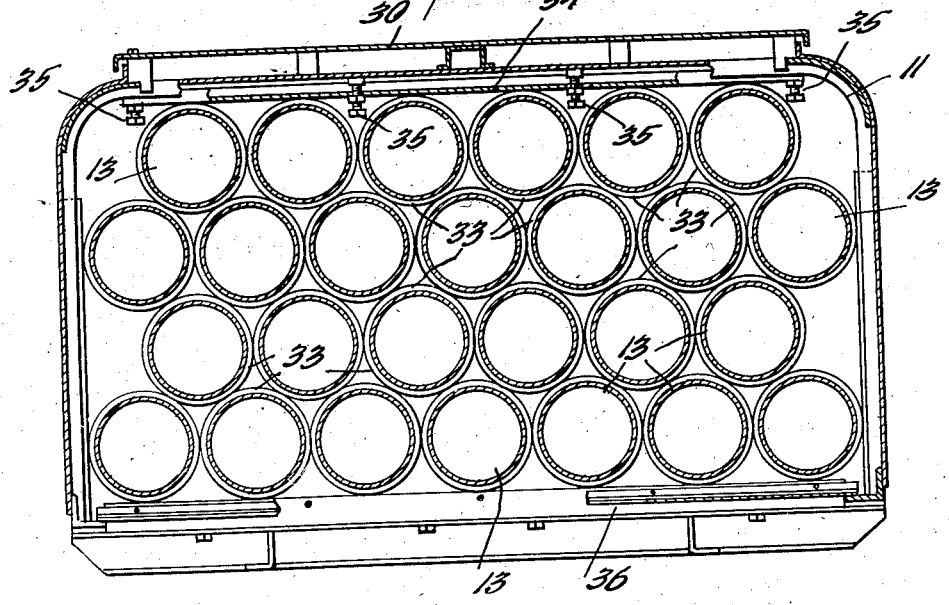
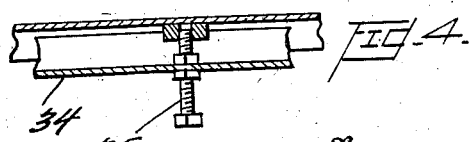

2,380,562

UNITED STATES PATENT OFFICE 2,380,562

TRANSPORT VEHICLE

James A. Watson, Jr., Silver Spring, Md.

Application April 27, 1943, Serial No. 484,754

6 Claims. (Cl. 280—5)

This invention relates to transport vehicles, and more particularly to vehicles, especially trailers, adapted for transporting gases under superatmospheric pressure. At the present time such vehicles are used by the military forces for the transportation of lighter-than-air gases for filling barrage balloons, dirigible balloons, and other lighter-than-air craft, but vehicles of the general type to which the invention relates have many uses apart from those aforesaid, particularly in industry, as for the transportation of industrial gases such as oxygen, hydrogen, acetylene, and the like.

For example, the current industrial practice in gas welding, oxy-acetylene cutting, and the like is to employ portable cylinders for the gases, which cylinders are delivered to the place of use by motor truck or other vehicle, requiring considerable manual handling. In establishments using considerable quantities of industrial gases under pressure it would be much more convenient and efficient to employ a vehicle, for example, a trailer or semi-trailer, permanently equipped with relatively large gas containers which vehicle, as an entity, would provide many times the volume of gas contained in the small cylinders now used. Preferably, the several containers on the vehicle would be manifolded to a single outlet, the individual containers being controlled by valves and the main outlet being likewise controlled by a valve. The vehicle could conveniently be driven or hauled to a location adjacent the work, and the gas conveyed from the vehicle to the cutting or welding torches through flexible piping, as is now the case in the use of small portable cylinders.

Other uses and advantages will suggest themselves to persons skilled in those arts employing gases under pressure, and it will be apparent that in some cases it may be desirable to have separate groups of containers manifolded together in order that more than one type of gas may be supplied from the same vehicle.

Vehicles, specifically trailers, for transporting gases under pressure have been used heretofore, and the present invention relates to an improvement in the construction of such vehicles. In the past, the gas containers, in the form of elongated, relatively narrow cylinders, have been disposed horizontally of the vehicle in a series of layers or tiers resting directly upon one another and thus transmitting the load (consisting mainly of the weight of the material of which the containers are constructed) downwardly through successively lower tiers to the frame of the vehicle. This arrangement has several disadvantages. In the case of containers adapted for use at very high pressures, and having correspondingly thick walls, the mechanical strength of the containers is such that they may be piled one upon another to a considerable height without adversely affecting those containers in the lower tiers. However, in the case of containers adapted for lower pressures, it might well be that the mechanical load imposed upon the lower containers by reason of the weight of those above them would require containers of heavier construction than would otherwise be necessary.

Again, where each container rests upon one or more similar containers lying beneath it, and partly or wholly supports a container lying above it, it is obvious that such container cannot conveniently be removed from the assembly for repair or replacement. A further disadvantage lies in the fact that where the containers rest upon each other, pockets are formed in which dirt and water can easily collect, whereas, by the same token, removal of the said dirt and/or water may only be effected with considerable difficulty.

For all of the above reasons, as well as others which will occur to those skilled in the art to which the present invention relates it is desirable to support the several containers on the vehicle in such a manner as to be substantially independent of each other and to be independently removable from the vehicle for the purposes of repair or replacement. The present invention provides means whereby this result is easily, inexpensively, and successfully achieved.

Other and further objects, features, and advantages of the present invention will be apparent to one skilled in the art from the following description taken in connection with the accompanying drawings in which:

Figure 1 is a vertical, longitudinal section through a vehicle constructed in accordance with the present invention;

Figure 2 is a transverse section on the line 2—2 of Figure 1;

Figure 3 is a transverse section on the line 3—3 of Figure 1;

Figure 4 is a fragmentary detailed view of a means employed for limiting vibration of the gas containers;

Figure 5 is a detailed view of the means employed for supporting one end of each container;

Figure 6 is an end elevation of the construction illustrated in Figure 5; and

Figure 7 is a view similar to Figure 5, showing the supporting means for the opposite end of each container.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to Figure 1 the reference character 10 indicates the frame of a vehicle, for example a semi-trailer, which serves no function except as a supporting base for the assembly to be described, and therefore need not be further discussed. Suitably secured upon the frame 10, and extending across the vehicle adjacent either end thereof, are transverse frameworks 11, 11' comprising plate-like members 12, 12' supported and based adjacent their peripheries by angle irons or other suitable reinforcing members. Each plate-like member 12, 12' is provided with a series of spaced apertures adapted to receive the supporting means for the gas containers, as hereinafter described. In the illustrated embodiment the gas containers 13, which take the form of elongated, relatively narrow cylinders, are arranged in a vertical series of tiers, each tier comprising a plurality of containers, and the apertures 14 of the plate-like members 12, 12' are similarly arranged. The spacing between the apertures 14 of each plate-like member is such, in relation to the diameter of the respective containers, that the containers, when assembled, will be spaced slightly apart both vertically and horizontally. Thus, no pockets are provided between the respective containers for the collection of dirt or moisture, and no substantial part of the mechanical load imposed by the upper containers is carried by the lower containers. On the contrary, the containers are individually supported, at their respective ends, by the members 12, 12' which in turn transmit the load directly to the respective ends of the frame 10.

At one end of the bank of cylinders or containers, each container is provided with an outlet valve 28 threaded into the end of the container, the said valves being manifolded together as illustrated in Figure 2. The details of the valves and manifolding form no part of the present invention and need not be further described.

The means by which the containers 13 are supported in the members 12, 12' are best illustrated in Figures 5–7. As will be seen in Figures 5 and 7, the respective ends of each container are reduced in diameter to form necks 15, 15' which are tapered externally and are of somewhat smaller diameter than the apertures in the respective plate-like members. The means for supporting the respective ends of the containers differs somewhat for reasons hereinafter explained in the case of that end of the container illustrated in Figure 7. The neck 15 is received in an internally tapered collar 16 which is permanently secured, as by welding 17, to the member 12, the shoulder 18 of the collar having a close fit within the corresponding apertures 14 of the member 12. The distal end of the neck 15 is threaded and provided with a nut 19 by means of which the neck of the container may be drawn into very tight engagement with the tapered inner surface of the collar 16, to prevent rotational as well as longitudinal movements of the container which might otherwise be caused by vibration during movement of the vehicle.

As seen in Figures 5 and 6, the means for supporting the opposite end of the container in the member 12' are somewhat different. In this case, a sleeve 20 is permanently secured within each aperture of the member 12' as by welding 21, the shoulder 22 of the sleeve having a tight fit within the aperture. The internal surface 23 of the sleeve 20 is cylindrical and is adapted to receive, with close tolerance, the cylindrical outer surface of a collar 24, which latter is adapted to be detachably secured within the sleeve 20 by means of bolts 25. Again, the distal end of the neck 15' is threaded and provided with a nut 26 for securing firm engagement between the tapered surfaces of the neck 15' and collar 24. The reference character 27 designates a safety relief device inserted in the end of the neck 15', with which the present invention is not further concerned.

As illustrated in Figure 6, accidental loosening of the bolts 25 which secure the collar 24 within the sleeve 20 may be prevented by means of a wire or other filament 29 threaded through suitable holes in the respective bolt heads and secured by twisting its ends together. Thus, the neck 15' of each container is firmly, though detachably, secured in the plate-like member 12'.

Preferably, the entire assembly is enclosed within a cover 30, seen in Figure 1, doors 31 and 32 being provided in the respective ends for easy access, to the safety device 27 and the valves 28.

In order to damp any vibrations of the containers 13 which might be caused by movement of the vehicle over rough roads or the like, as well as to prevent contact between the containers in the event of excessive vibrations, each container is preferably provided with a resilient collar 33 of rubber or similar material, the several collars 33 being disposed opposite each other at points intermediate the ends of the containers. A bar 36 extends transversely of the frame beneath the containers at the location of the collars 33, and a further bar 34 (Figures 3 and 4) is adjustably secured to the cover 30 by means of bolts 35, which may be rotated to draw the bar 34 into firm contact with the collars 33 encircling the containers of the uppermost tier, thus enabling a certain initial stressing of the resilient material of the collars 33 between the bars 34 and 36, which is desirable in obtaining the maximum vibration damping effect.

In assembling the containers 13 between the plate-like members 12, 12', which is of course carried out initially before the cover 30 is installed, a container, supported at a sufficient angle to the longitudinal axis of the vehicle, is moved into such position that the neck 15' may be inserted through the sleeve 20 a sufficient distance to permit the container to be further moved into a position parallel to the axis of the vehicle, after which it is moved endwise to insert the neck 15 into the collar 16. The nut 19 is then threaded onto the protruding end of the neck 15 and tightened, after which the collar 24 is installed over the opposite neck 15' and bolted to the sleeve 20. The nut 26 is then threaded onto the protruding end of the neck 15' and tightened. In removing the container for repair or replacement, which of course necessitates prior removal of the cover 30, the procedure is exactly reversed. If desired, the cover 30 may be dispensed with, thus facilitating repair or replacement of containers.

In removing a container of any tier below the uppermost, except in the case of the outermost containers of each tier, which may be removed sidewise, it is of course first necessary to remove one or more outer containers, but in any case only a small number relative to the total.

Having thus described the invention, what is claimed as new and desired to be secured by Letters Patent is:

1. In a vehicle, a framework, a spaced pair of rigid supporting structures secured transversely of said framework, each said structure including a platelike member lying in a vertical plane, each said plate-like member having a series of spaced apertures, and a series of elongated containers extending between and supported by said plate-like members, each end of each said container extending through one of said apertures, and means acting between each said container and said plate-like members for removably securing said containers to said members, said last means comprising internally tapered collars, and said containers having externally tapered necks at either end for engagement with said collars.

2. In a vehicle, a framework, a spaced pair of rigid supporting structures secured transversely of said framework, each said structure including a plate-like member lying in a vertical plane, each said plate-like member having a series of spaced apertures, and a series of elongated containers extending between and supported by said plate-like members, each end of each said container extending through one of said apertures, and means acting between each said container and said plate-like members for removably securing said containers to said members, said last means comprising internally tapered collars, and said containers having externally tapered necks at either end for engagement with said collars, the degree of taper of said necks and collars being such as to enable the said containers to be secured against accidental rotation.

3. In a vehicle, a framework, a spaced pair of rigid supporting structures secured transversely of said framework, each said structure including a plate-like member lying in a vertical plane, each said plate-like member having a series of spaced apertures, and a series of elongated containers extending between and supported by said plate-like members, each end of each said container extending through one of said apertures, and means acting between each said container and said plate-like members for removably securing said containers to said members, said last means comprising a pair of collars adapted to engage the respective ends of each container, one of said collars being permanently secured in an aperture of one of said plate-like members, the other collar of said pair being detachably secured within the corresponding aperture of said other plate-like member.

4. In a vehicle, a framework, a spaced pair of rigid supporting structures secured transversely of said framework, each said structure including a plate-like member lying in a vertical plane, each said plate-like member having a series of spaced apertures, and a series of elongated containers extending between and supported by said plate-like members, each end of each said container extending through one of said apertures, means acting between each said container and said plate-like members for removably securing said containers to said members, said last means comprising a pair of collars adapted to engage the respective ends of each container, one of said collars being permanently secured in an aperture of one of said plate-like members, the other collar of said pair being detachably secured within the corresponding aperture of said other plate-like member, and means for securing the respective ends of said containers within their respective collars.

5. In a vehicle, a framework, a spaced pair of rigid supporting structures secured transversely of said framework, each said structure including a plate-like member lying in a vertical plane, each said plate-like member having a series of spaced apertures, and a series of elongated containers extending between and supported by said plate-like members, each end of each said container extending through one of said apertures, and means acting between each said container and said plate-like members for removably securing said containers to said members, said containers having externally tapered necks at either end and said securing means comprising internally tapered collars adapted to receive said necks and means associated with said necks and collars for detachably securing the former within the latter.

6. In a vehicle, a framework, a spaced pair of rigid supporting structures secured transversely of said framework, each said structure including a plate-like member lying in a vertical plane, one of said plate-like members having a series of spaced apertures, and a series of elongated containers extending between and supported by said plate-like members, one end of each said container extending through one of said apertures, and means acting between each said container and said plate-like members for removably securing said containers to said members, said last means comprising an internally tapered collar associated with each said container, said containers having externally tapered necks at one end for engagement with said collars.

JAMES A. WATSON, Jr.